US006996581B2

(12) United States Patent
Houston et al.

(10) Patent No.: US 6,996,581 B2
(45) Date of Patent: Feb. 7, 2006

(54) TEMPLATE MANAGEMENT OF DATABASE INSTANCES

(75) Inventors: William M. Houston, Colchester, VT (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 09/966,246

(22) Filed: Sep. 28, 2001

(65) Prior Publication Data

US 2003/0065681 A1 Apr. 3, 2003

(51) Int. Cl.
G06F 17/30 (2006.01)
(52) U.S. Cl. ..................................................... 707/200
(58) Field of Classification Search ............... 707/1, 707/9, 101, 102, 200, 201, 100, 203, 204; 709/221

See application file for complete search history.

(56) References Cited

U.S. PATENT DOCUMENTS

| | | | |
|---|---|---|---|
| 5,581,754 A | | 12/1996 | Terry et al. |
| 5,819,251 A | * | 10/1998 | Kremer et al. ................ 707/1 |
| 5,838,918 A | * | 11/1998 | Prager et al. ............... 709/221 |
| 5,956,719 A | | 9/1999 | Kudo et al. |
| 5,966,716 A | * | 10/1999 | Comer et al. ................ 707/203 |
| 5,983,231 A | | 11/1999 | Minatogawa et al. |
| 6,615,223 B1 | * | 9/2003 | Shih et al. ................... 707/201 |
| 2003/0200197 A1 | * | 10/2003 | Long et al. ..................... 707/1 |

* cited by examiner

*Primary Examiner*—Mohammad Ali
*Assistant Examiner*—Etienne P LeRoux
(74) *Attorney, Agent, or Firm*—Schmeiser, Olsen & Watts; William E. Schiesser

(57) ABSTRACT

A method and computer system for generating and maintaining database instances. A template manager creates the template for generating the instances based on design information, stores the template in a template manager database, generates N instances ($N \geq 2$) based on the template and on control information for the N instances, stores the N instances in the template manager database, and transmits the N instances to corresponding N locations. The control information includes access control information and configuration control information that includes identification of N locations corresponding to the N instances. The template manager refreshes the template based on update design information, refreshes the N instances based on the refreshed template, and transmits the N refreshed instances to the corresponding N locations. The template manager may refresh M of the N instances ($M \leq N$), based on update control information, and transmit the M refreshed instances to the corresponding M locations.

38 Claims, 10 Drawing Sheets

| Term | Definition |
|---|---|
| Design information | Information as to how the database is organized and structured (e.g. tables, columns, data types, titling, justification, color, etc.) |
| Control information | 1. Configuration control information<br>    Ex: locational information (e.g., server and path)<br>    Ex: administrative information<br>    (e.g., names of administrators)<br>2. Access control information<br>    (identification of groups and individuals having security access to views, instances, tables, etc. of a database) |
| View | Virtual table of data in the database |
| Instance | Database structured and configured in accordance with design information and control information |
| Template | Design information and control information underlying an instance |
| Template manager database | Database that includes templates and associated instances |
| Template manager | Computer program that manages templates and associated instances |
| Code | Software executed in the foreground |
| Agent | Software executed in the background |

Instances: Client Information Manager (CIM)

| Status | Date Last Drafted, Created, or Refreshed | Instance Identifier | Instance Server |
|---|---|---|---|
| ▽ Draft | 08/15/2001 | CIM EQUIP1 | Z/ALPHA |
| | | CIM EQUIP2 | Z/ALPHA |
| ▷ Created | ▷ 08/22/2001 | CIM RESEARCH | Z/ETA/MU |
| ▽ Refreshed | ▽ 08/26/2001 | CIM TELCOM | Y/A/B/C/D |
| | | CIM BACKUP | X/BETA |
| | ▷ 08/28/2001 | CIM CLIENTS | W/GAMMA/THETA |
| | ▽ 08/23/2001 | CIM VACATION | X/BETA/T1 |
| | | CIM HOLIDAYS | X/BETA/T2 |
| | | | |

Instance Mapping Definition: Client Information Manager (CIM)

| Instance Identifier | CIM RESEARCH |
|---|---|
| Status | Created |
| Date Created | 08/22/2001 |
| Date Last Refreshed | |
| Generate configuration control document | Generate configuration control document |
| Location | Server: Z/ETA/MU<br>Path and file: "shared/cim/research.nsf" |
| | |

Instance Mapping Definition: Client Information Manager (CIM)

| Instance Identifier | CIM BACKUP |
|---|---|
| Status | Refreshed |
| Date Created | 08/24/2001 |
| Date Last Refreshed | 08/26/2001 |
| Generate configuration control document | Generate configuration control document |
| Location | Server: X/BETA<br>Path and file: "split/cim/backup.abc" |
| | |

Configuration Control Document: Client Information Manager (CIM)

| Instance Identifier | CIM RESEARCH |
|---|---|
| Administrators | K.D. Fay (Miami), L.B. Kent (Chicago), A.T. Elliot (Boston), J.S. Zurkoff (Miami), C.O. Anton (Baltimore) |
| Location | Server:     Z/ETA/MU<br>Path and file: "shared/cim/research.nsf" |
| Archive Databases | Server:     Z/ETA/MU<br>Path and file: "shared/cim/archive/research.nsf" |
| | |

Configuration Control Document: Client Information Manager (CIM)

| Instance Identifier | CIM BACKUP |
|---|---|
| Administrators | F.E. George, D.E. Terrance, J.P. Glickman |
| Location | Server:     X/BETA<br>Path and file: "split/cim/backup.abc" |
| Archive Databases | Server:     X/BETA<br>Path and file: "split/cim/archive/backup.abc" |
| | |

Instances: Client Information Manager (CIM) - Access Control

| Instance Identifier | Group |
|---|---|
| ▽ CIM RESEARCH | CIM Managers |
| | CIM Editors |
| | CIM Physicists |
| ▽ CIM TELCOM | CIM Managers |
| | CIM Programmers |
| | B.A. Kettle |
| | CIM Secretaries |

56 ↓

Group: CIM Administrators

| | |
|---|---|
| Instance Identifier | CIM RESEARCH |
| Group | CIM Managers |
| Group Type | Multi-purpose |
| Description | CIM Managers For Basic Research |
| Members | CIM-Managers-1, J.E. Peek |
| | |

Group: CIM Administrators

| | |
|---|---|
| Instance Identifier | CIM TELCOM |
| Group | CIM Managers |
| Group Type | Special-purpose |
| Description | CIM Managers For Communication |
| Members | S.S. Bay, R.P. Stoker, D.Y. Friend |
| | |

*FIG. 12*

TEMPLATE MANAGEMENT OF DATABASE INSTANCES

BACKGROUND OF THE INVENTION

1. Technical Field

The present invention relates to a method and computer system for generating and maintaining database instances corresponding to a template.

2. Related Art

LOTUS DOMINO® has a native capability to refresh the design of, and the data in, a DOMINO® database. Unfortunately, this native capability is limited and lacks flexibility. Thus, there is a need for a more flexible capability to refresh the design of, and the data in, a database.

SUMMARY OF THE INVENTION

The present invention provides a method for generating and maintaining N database instances in accordance with a template, said method comprising:

creating the template based on design information, said creating the template implemented by a template manager;

storing the template in a template manager database, said storing the template implemented by the template manager;

generating the N instances based on the template and on control information for the N instances, said control information including configuration control information, said configuration control information identifying N locations corresponding to the N instances, said N at least 2, said generating the N instances implemented by the template manager;

storing the N instances in the template manager database, said storing the N instances implemented by the template manager; and transmitting the N instances to the corresponding N locations, said transmitting the N instances implemented by the template manager.

The present invention provides a computer system for generating and maintaining N database instances in accordance with a template, said computer system comprising a template manager and a template manager database, said template manager adapted to:

create the template based on design information;

store the template in the template manager database;

generate the N instances based on the template and on control information for the N instances, said control information including configuration control information, said configuration control information identifying N locations corresponding to the N instances, said N at least 2;

store the N instances in the template manager database; and transmit the N instances to the corresponding N locations.

The present invention advantageously stores and updates information (i.e., design information and control information) in a template manager database for a plurality of database instances, wherein this information may be used to flexibly generate and refresh a plurality of database instances.

The present invention advantageously permits having an agent find design information and control information as needed for generating and refreshing the plurality of database instances.

The present invention advantageously permits selective generation and refreshing of access control lists on a group basis for generating and refreshing the plurality of database instances.

BRIEF DESCRIPTION OF THE DRAWINGS

FIG. 1 is a table of definitions, in accordance with embodiments of the present invention.

FIG. 5 is a view identifying database instances, in accordance with embodiments of the present invention.

FIGS. 6 and 7 are documents, each showing information relating to a particular instance listed in FIG. 5, in accordance with embodiments of the present invention.

FIGS. 8 and 9 are documents, each showing configuration control information relating to a particular instance listed in FIG. 5, in accordance with embodiments of the present invention.

FIGS. 11–12 are documents, each showing information relating to a particular access control group listed in FIG. 10, in accordance with embodiments of the present invention.

DETAILED DESCRIPTION OF THE INVENTION

A database is an integrated collection of data that supplies information in a variety of forms. For example, a database may comprise, inter alia, a collection of tables. Information about a database may include, inter alia, design information and control information. Design information comprises information as to how the database is organized and structured. Design information may include, inter alia, tables, columns in each table, data types, titling, data justification, color, etc. Control information may comprise, inter alia, configuration control information and access control information. Configuration control information comprises, inter alia, locational information (e.g., server and path at which the database is located), administrative information (e.g., names of administrators at various locations, at a single location, for a department or unit, etc.). Access control information comprises, inter alia, identification of groups and individuals having security access to views, instances, tables, etc. of a database. Security access includes various access levels such as, inter alia, read access, write access (e.g, create or edit), delete access, no access, etc. A "view" of a database is a "virtual table" in which data of the database is represented in the form of a table, but does not actually exist as a table of the database structure. An "instance" is a database in accordance with given design information and control information. Note that an instance of a database may or may not contain data, exclusive of control information, at any given time. A "template" of an instance is the design information and control information that underlies the instance. Thus, a single template underlies multiple instances of the present invention. A template does not include data that is in the instance. A "template manager database" is a database that includes templates and associated instances. A "template manager" is a computer program that manages generation of templates, storage of templates in the template manager database, generation of instances associated with the templates, transmission of instances to designated locations, refreshing (i.e, updating) of instances, etc. The template manager may itself directly perform some or all of template manager's functions and/or may utilize subsidiary software to perform some or all of the template manager's functions (e.g., generate or otherwise obtain design information and control information, or portions thereof). The subsidiary software may include one or more "codes" (i.e., software executed in the foreground) and/or one or an "agents" (i.e., software executed in the background). FIG. 1 summarizes the preceding definitions.

Figure 2:
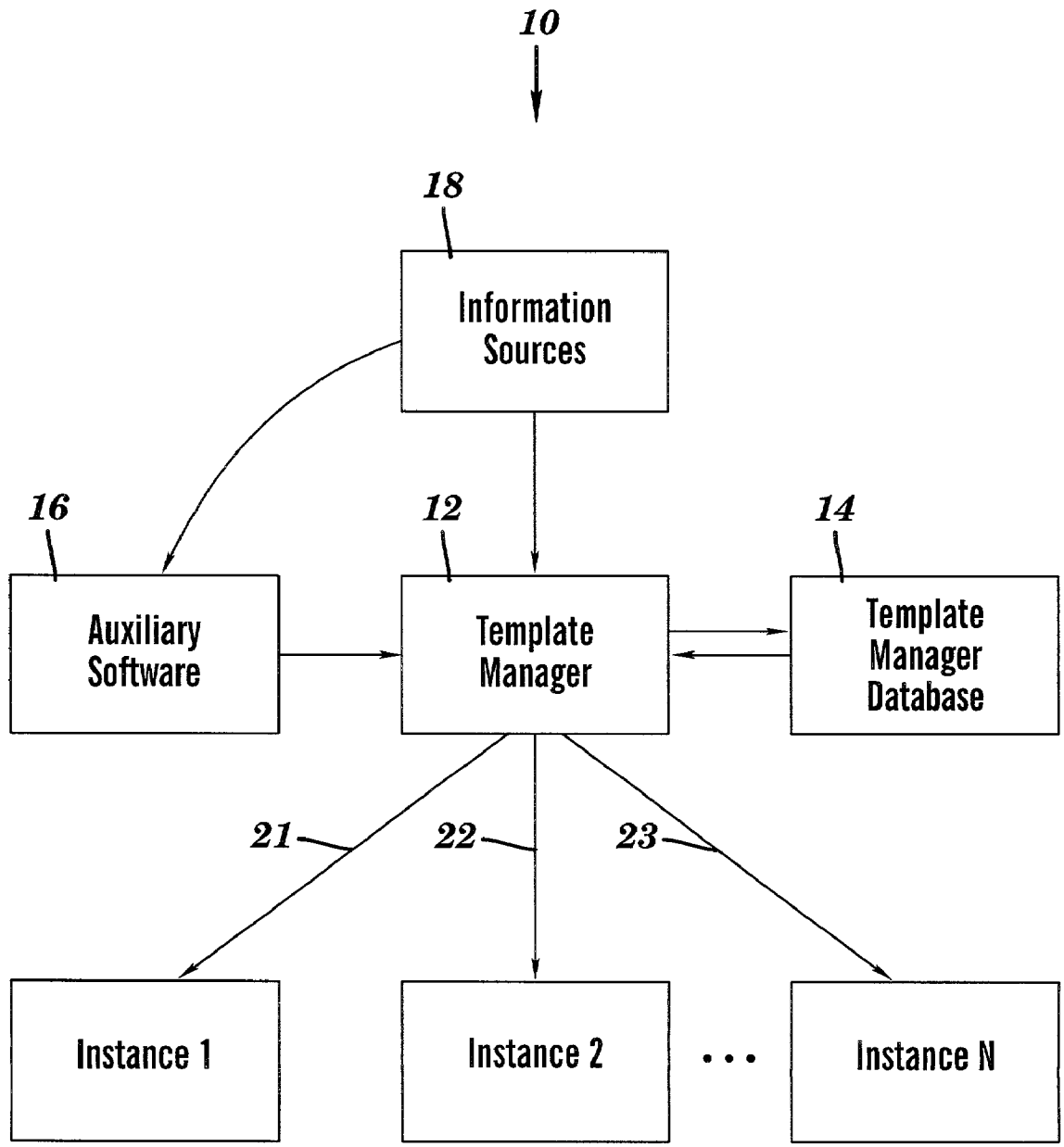
FIG. 2 is a block diagram of a computer system and associated method, depicting generation and refreshing of database instances, in accordance with embodiments of the present invention.

FIG. 2 is a block diagram 10 of a computer system and associated method, depicting generation and refreshing of database instances, in accordance with embodiments of the present invention. In FIG. 2, a template manager 12 receives design information and control information either directly from information sources 18, or indirectly from information sources 18 through use of auxiliary software 16. The auxiliary software 16 may comprise a code or an agent. Coding of the auxiliary software 16 may be, inter alia, in a form such as object code or in a source form such that the auxiliary software 16 must be interpreted in order to be executed. Examples of the auxiliary software 16 include a script (e.g., a LOTUS® script, a UNIX script, etc.), a stand-alone program, a subroutine (or subprogram or function) of the template manager 12, etc. The information source may comprise, inter alia, user input, input from a file, table, database, etc., input generated by software, etc.

The template manager 12 utilizes the design information to create a template from which database instances will be generated. The template manager 12 stores the template in a template manager database 14, and retrieves said template from the template manager database 14 as needed. The template manager 12 then generates N database instances (i.e., Instance 1, Instance 2, . . . , Instance N) and stores the N instances in the template manager database 14. N is at least 2. Generating the N database instances and storing the N instances in the template manager database 14 may be implemented either as sequential processes or as one unified process (i.e., the generating and storing may be programmed to occur together). Although the N instances may differ from each other or one another with respect to their associated configuration control information, the N instances are each keyed to the same design template. Additionally, the template manager 12 transmits the N instances to corresponding N locations. The N locations may be identified in the form of configuration control information as will be illustrated infra in conjunction with FIGS. 6 and 7. The N instances may be transmitted by the template manager 12 to the corresponding N locations over any data paths 21, 22, . . . , 23, such as, inter alia, direct hardware connection, telephone lines, cable lines, a data communications network generally, etc. The various locations may reside: all at one server, at the same directory of a server, at different servers, in different directory paths, etc.

Figure 3:
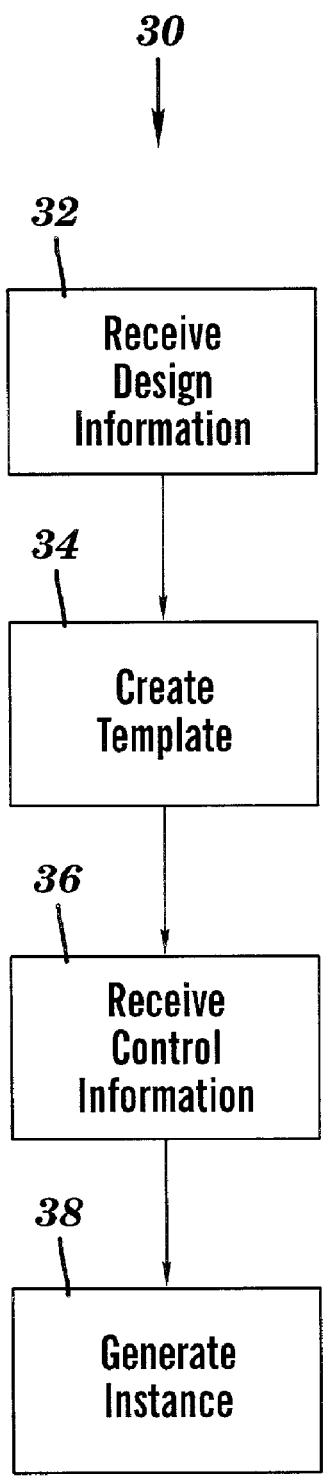
FIG. 3 is a block diagram depicting a sequence of events for generating a database instance, in accordance with embodiments of the present invention.

FIG. 3 is a flow chart 30 depicting a sequence of events for generating 38 a database instance (representing any of the Instances 1, 2, . . . , N of FIG. 2), in accordance with embodiments of the present invention. In FIG. 3, the template manager 12 (see FIG. 2) engages in the following activities in sequence: receives 32 design information from the information sources 18 (see FIG. 2 and accompanying discussion regarding the information sources 18), creates 34 a template based on the design information, receives 36 control information from the information sources 18 (see FIG. 2 and accompanying discussion), and generates 38 the instance based on the template and on the control information. Creating 34 the temple and receiving 36 control information could be interchanged in sequence. Generating 38 the instance includes, or is followed, by storing the instance in the template manager database 14 as explained supra in conjunction with FIG. 2.

Figure 4:
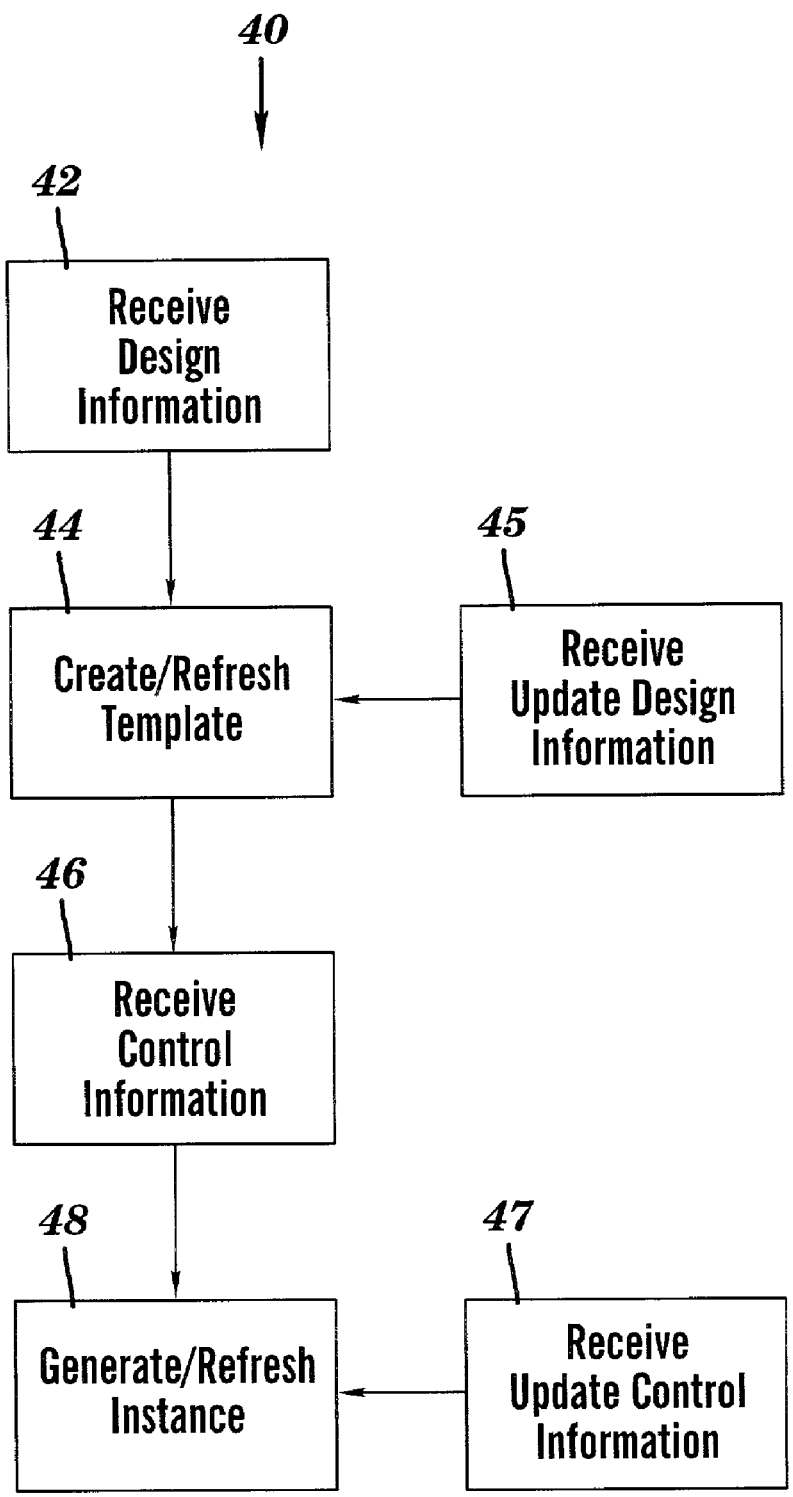
FIG. 4 is a block diagram depicting a sequence of events for generating or refreshing a database instance, in accordance with embodiments of the present invention.

FIG. 4 is a flow chart 40 depicting a sequence of events for generating or refreshing a database instance (representing any of the Instances 1, 2, . . . , N of FIG. 2), in accordance with embodiments of the present invention. FIG. 4 depicts the same sequence as in FIG. 3 for generating the database instance, and additionally depicts a sequence for refreshing the database instance after the database instance has been previously generated. In FIG. 4, the template manager 12 (see FIG. 2) engages in the following activities in sequence for generating the instance: receives 42 design information from the information sources 18 (see FIG. 2 and accompanying discussion), creates 44 a template based on the design information, receives 46 control information from the information sources 18 (see FIG. 2 and accompanying discussion), and generates 48 the instance based on the template and on the control information. Creating 44 the temple and receiving 46 control information could be interchanged in sequence. Generating 48 the instance includes, or is followed, by storing the instance in the template manager database 14 as explained supra in conjunction with FIG. 2.

In FIG. 4, the template manager 12 (see FIG. 2) engages in the following activities in sequence for refreshing the instance: receives 47 update control information from the information sources 18 (see FIG. 2 and accompanying discussion), and refreshes 48 the instance based on the update control information. The update control information comprises control information that has changed since the previous time that the template manager 12 received any control information. The updated control information may be provided by any method described supra in conjunction with FIG. 2 (e.g., through use of an agent or code) for obtaining control information from the information sources 18. Generally, if N instances have been created (N≧2), then said updating of control information may occur for M instances of the N instances, wherein M≦N.

In FIG. 4, the template manager 12 (see FIG. 2) may also refresh the template by engaging in the following activities in sequence for refreshing the template: receives 45 update design information from the information sources 18 (see FIG. 2 and accompanying discussion), and refreshes 44 the template based on the update design information. The update design information comprises design information that has changed since the previous time that the template manager 12 received any design information. The updated design information may be provided by any method described supra in conjunction with FIG. 2 (e.g., through use of an agent or code) for obtaining design information from the information sources 18. After the template is refreshed the instance is generated (if the instance has not been previously generated), or refreshed (if the instance has been previously generated), by the following sequence: receives 46 control information from the information sources 18 (see FIG. 2 and accompanying discussion), and generates/refreshes 48 the instance based on the refreshed template and the control information.

FIGS. 5–12 illustrate database instances accompanied by control information.

FIG. 5 is a view 50 identifying database instances, in accordance with embodiments of the present invention. Each row of the view 50 is associated with a database instance that is identified in the "Instance Identifier" column. The instances listed in the view of FIG. 5 each relate to a database called the "Client Information Manager" (CIM) database, as shown. The symbol ∇ next to a value in a given column signifies that the value in the given column pertains to all subsequent rows until another value in the given column appears. The symbol ▷next to a value in a given column signifies that the value in the given column pertains to only the row that actually includes the value in the given column. The "Status" column indicated the status of the instance. The instance has a status of "Draft" when the template is created and the instance has not yet been generated. The instance has a status of "Created" if the instance has been generated but has not been refreshed. The instance has a status of "Refreshed" if the instance has been generated and refreshed. The "Date Last Drafted, Created, or Refreshed" column is self-explanatory. The "Instance Server" column identifies a server at the location to which the instance has, or shall be, transmitted by the template manager 12 (see FIG. 2) over data paths (e.g., data paths 21–23 of FIG. 2). Note, however, the instance is not required to be transmitted to a server, but may be alternatively transmitted to any computer environment such as a stand-alone computer.

FIGS. 6 and 7 are documents 51 and 52, showing information respectively relating to the instance "CIM RESEARCH" and "CIM BACKUP" listed in FIG. 5, in accordance with embodiments of the present invention. The "Location" is the location to which the instance has, or shall be, transmitted by the template manager 12 (see FIG. 2) over data paths (e.g., data paths 21–23 of FIG. 2). In FIGS. 6 and 7, the "Location" is identified by a "Server" and a "Path and File". As described supra, however, the "Location" need not include a server and may alternatively include any computer environment such as a stand-alone computer.

FIGS. 6 and 7 include a clickable, or otherwise selectable, area called "Generate configuration control document." When said selectable area is so selected, the configuration control documents 53 and 54 of FIGS. 8 and 9 pop up, corresponding to the instances "CIM RESEARCH" and "CIM BACKUP" of FIGS. 6 and 7, respectively. FIGS. 8 and 9 illustrate the configuration control parameters "Administrators", "Location", "Archive Databases", etc. The listed administrators are responsible for administrating programs, people, resources, etc. associated with whatever the Instance Identifier represents. For example, the Instance Identifier "CIM RESEARCH" represents research programs and activities relating to the Client Information Manager (CIM) database. In FIG. 8, the administrators belong to the same organization or organizational component but are situated at different locations as shown. Thus, FIG. 8 is an example of configuration control information (e.g., administrator information, which is an example of administrative information), that is location dependent. In FIG. 9, the administrators are situated at the same location. Thus, FIG. 9 is an example of configuration control information (e.g., administrator information, which is an example of administrative information) that is location independent. FIGS. 8 and 9 also show "Location" information which was explained supra in conjunction with FIGS. 6 and 7. Additionally, FIGS. 8 and 9 show "Archive Databases" at which the versions (initial version and updated versions) of the instances are archived. Similar to "Location" as described supra, the "Location" need not include a server and may alternatively include any archive environment such as file, table, or database of a server a stand-alone computer, etc., as well as any storage medium such as magnetic tape, removable hard disk, floppy disk, microfilm, etc.

Figure 10:
FIG. 10 is a view identifying access control groups for instances of FIG. 5, in accordance with embodiments of the present invention.

FIG. 10 is a view 55 identifying access control groups for instances "CIM RESEARCH" and "CIM TELCOM" of FIG. 5, in accordance with embodiments of the present invention. FIG. 10 shows that the instance "CIM RESEARCH" comprises three groups, namely "CIM Managers", "CIM Editors" and "CIM Physicists". Similarly, the instance "CIM TELCOM" comprises four groups, namely "CIM Managers", "CIM Programmers", "B. A. Kettle", and "CIM Secretaries". Note that a "group" may be identified by a group name that stands for one or more persons, or may explicitly be the name of an individual person. For example in FIG. 10, "B. A. Kettle" identifies a group that is explicitly identified as the name of the individual person B. A. Kettle. In contrast, the other groups of "CIM Managers", "CIM Editors", etc. shown in FIG. 5 are group names stands for one or more persons, as illustrated in FIGS. 11 and 12.

FIGS. 11–12 are documents 56 and 57, showing information relating to the group "CIM Managers" of the Instance "CIM RESEARCH" and to the group "CIM Managers" of the Instance "CIM TELCOM", in accordance with embodiments of the present invention. The group members of the group "CIM Managers" of the Instance "CIM RESEARCH" listed in FIG. 11 are "CIM-Managers-1" and "J. E. Peek." While "J. E. Peek" identifies a person, "CIM-Managers-1" identifies another group, wherein the persons actually belonging to the "CIM-Managers-1" group are identified elsewhere. The group members of the group "CIM Managers" of the Instance "CIM TELCOM" listed in FIG. 12 are "S. S. Bay", "R. P. Stoker", and "D. Y. Friend," and each such group member identifies a person. As illustrated by FIGS. 11 and 12, two groups having the same name but associated with different instances may have different group members (e.g., "CIM Managers" associated with instances "CIM RESEARCH" and "CIM TELCOM").

A group member could be identified in any other manner than has been illustrated in FIGS. 11 and 12. For example, a group member could be a file-pathname (e.g., "cim/comm/mgr1" relating to an identified server or computer) such that the file associated with the file-pathname contains names of persons and/or groups.

If a plurality of access control groups are associated with a given instance, then each such access control group of the plurality of access control groups has an independent level of access control relating to the given instance. Furthermore, different persons within an access control group may have different levels of access control. Such access levels include, inter alia, read access, write access (e.g, create or edit), delete access, no access, etc.

Groups can be created and maintained exclusively by the template manager 12 (see FIG. 2) if centralized control of security is desired. As part of the refresh process, the template manager 12 would propagate the updated group information to the name of the address book on the servers that contains the relevant instances. If local or remote control of security is permitted, the remote server can add or delete groups to the access control list, or can modify such groups.

FIGS. 11 and 12 also include the parameter "Group Type" inasmuch as each group may be of a particular "type," as defined by the computer system in which the template management system of the present invention resides. FIGS. 11 and 12 further include the parameter "Description" which can include any descriptive text such as, inter alia, additional text appended to the group name, as illustrated in FIGS. 11 and 12.

Figure 13:
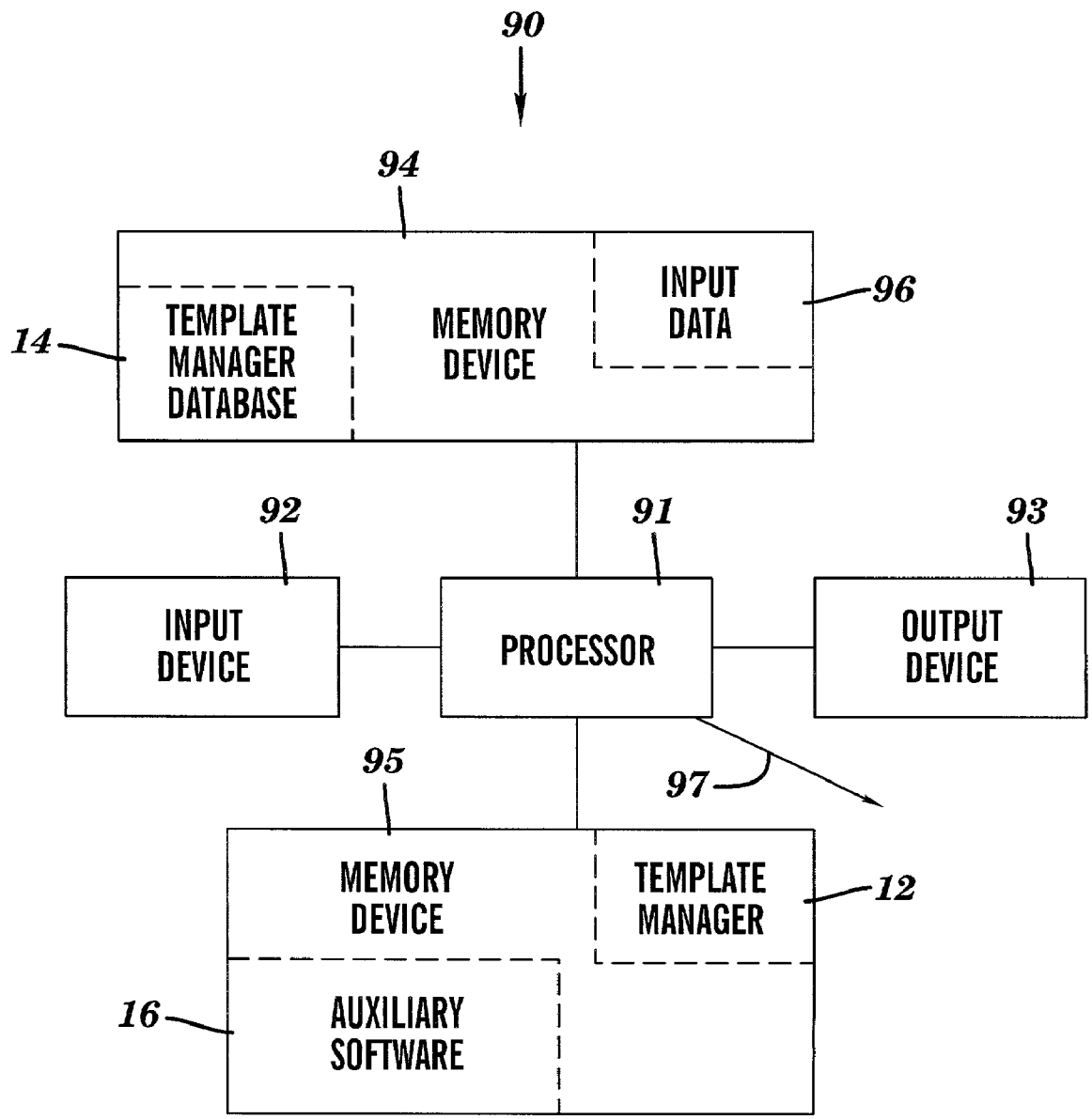
FIG. 13 depicts a computer system for generating and maintaining a plurality of database instances in accordance with a template, in accordance with embodiments of the present invention.

FIG. 13 depicts a computer system 90 for generating and maintaining N database instances (See FIG. 2), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95, which is a computer usable medium, stores the template manager 12 (see FIG. 2) and the auxiliary software 16 (see FIG. 2) (e.g., agents, codes, etc.). The memory device 94, which is a computer usable medium, stores the template manager database 14. The processor 91 executes the template manager 12 and the auxiliary software 16. The memory device 94 includes input data 96. The input data 96 includes input required by the template manager 12 and the auxiliary software 16. The output device 93 displays output, such as a template, an instance, etc., or portions thereof. The computer system 90 also comprises data paths 97 for transmitting database instances by the template manager 12 (analogous to the data paths 21–23 of FIG. 2).

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices. As another example, the template manager 12, the auxiliary software 16, and the template manager database 14 may be distributed in the memory devices 94 and 95 in a different manner than is shown in FIG. 13.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for generating and maintaining database instances in accordance with a template, said method comprising:

creating the template based on design information, said creating the template implemented by a template manager;

identifying N database instances upon said creating the template, each of the N instances not having been generated and having a status of Draft, said N at least 2;

storing the template in a template manager database, said storing the template implemented by the template manager;

generating the N instances based on the template and on control information for the N instances, said control information including configuration control information, said configuration control information identifying N locations corresponding to the N instances, said generating the N instances implemented by the template manager, said generated N instances having a status of Created because said N instances have been generated;

storing the N instances in the template manager database, said storing the N instances implemented by the template manager;

transmitting the N instances to the corresponding N locations, said transmitting the N instances implemented by the template manager;

refreshing M instances of the N instances based on update control information, said M less than N, said refreshing the M instances implemented by the template manager, said refreshed M instances having a status of Refreshed because said M instances have been refreshed, leaving a remaining N−M instances of the N instances still having the status of Created;

transmitting the M refreshed instances to the corresponding M locations, said transmitting the M instances implemented by the template manager; and generating a view, said generated view being a table, said generated view identifying the refreshed M instances as having the status of Refreshed and identifying the remaining N−M instances as having the status of Created.

2. The method of claim 1, said control information further including administrative information.

3. The method of claim 2, said administrative information being location dependent.

4. The method of claim 3, said administrative information including administrator information.

5. The method of claim 1, said control information comprising access control information, said access control information identifying at least one access control group for each instance of the N instances, wherein if a plurality of access control groups are associated with a given instance then each such access control group of the plurality of access control groups has an independent level of access control relating to the given instance.

6. The method of claim 1, said method further comprising:
obtaining the design information, said obtaining implemented by an agent; and
transmitting the design information to the template manager, said transmitting the design information implemented by the agent.

7. The method of claim 1, said method further comprising:
obtaining a portion of the control information, said obtaining implemented by an agent; and
transmitting the portion of the control information to the template manager, said transmitting the portion of control information implemented by the agent.

8. The method of claim 1, said transmitting the N instances comprising transmitting the N instances to the corresponding N locations over telephone lines or cable lines.

9. The method of claim 1, said method further comprising:
refreshing the template based on update design information, said refreshing the template implemented by the template manager;
refreshing the remaining N−M instances based on the refreshed template, said refreshing the remaining N−M instances implemented by the template manager; and
transmitting the refreshed remaining N−M instances to the corresponding N−M locations, said transmitting the refreshed remaining N−M instances implemented by the template manager.

10. The method of claim 9, said method further comprising providing the update design information to the template manager, said providing the update design information implemented by an agent.

11. The method of claim 1, said method further comprising providing the update control information to the template manager, said providing the update control information implemented by an agent.

12. The method of claim 1, said view comprising a Status column that identifies the status of Refreshed for the refreshed M instances and the status of Created for the remaining N−M instances.

13. The method of claim 12, said method further comprising identifying an additional database instance upon said creating the template, wherein during generating the view the additional instance has not been generated and has a status of Draft because the additional instance has been identified but has not yet been generated, said generated view identifying the additional instance as having the status of Draft, and wherein the Status column identifies the status of Draft for the additional instance.

14. The method of claim 13, said view further comprising a Date Last Drafted, Created or Refreshed column, wherein each entry in the Date Last Drafted, Created or Refreshed column identities a last date at which the status of Draft, Created or Refreshed denoted in an associated entry in the Status column was respectively acquired by an associated instance of the N instances.

15. The method of claim 12, said view further comprising an Instance Identifier column, wherein each entry in the Instance Identifier column identifies a unique instance of the N instances, and wherein each entry in the Status column is associated with a correspond entry in the Instance Identifier column.

16. The method of claim 15, said view further comprising an Instance Server column, wherein each entry in the Instance Server column identifies a server at a location to which an associated instance in the Instance Identifier column has, or shall be, transmitted to the template manager.

17. A computer system comprising a processor and a computer readable memory unit coupled to the processor, said memory unit containing software that when executed by the processor implement a method for generating and maintaining database instances in accordance with a template, said method comprising:
   creating the template based on design information, said creating the template implemented by a template manager;
   identifying N database instances upon said creating the template, each of the N instances not having been generated and having a status of Draft, said N at least 2;
   storing the template in a template manager database, said storing the template implemented by the template manager;
   generating the N instances based on the template and on control information for the N instances, said control information including configuration control information, said configuration control information identifying N locations corresponding to the N instances, said generating the N instances implemented by the template manager, said generated N instances having a status of Created because said N instances have been generated;
   storing the N instances in the template manager database, said storing the N instances implemented by the template manager;
   transmitting the N instances to the corresponding N locations, said transmitting the N instances implemented by the template manager;
   refreshing M instances of the N instances based on update control information, said M less than N, said refreshing the M instances implemented by the template manager, said refreshed M instances having a status of Refreshed because said M instances have been refreshed, leaving a remaining N−M instances of the N instances still having the status of Created;
   transmitting the M refreshed instances to the corresponding M locations, said transmitting the M instances implemented by the template manager; and
   generating a view, said generated view being a table, said generated view identifying the refreshed M instances as having the status of Refreshed and identifying the remaining N−M instances as having the status of Created.

18. The computer system of claim 17, said control information further including administrative information.

19. The computer system of claim 18, said administrative information being location dependent.

20. The computer system of claim 19, said administrative information including administrator information.

21. The computer system of claim 17, said control information comprising access control information, said access control information identifying at least one access control group for each instance of the N instances, wherein if a plurality of access control groups are associated with a given instance then each such access control group of the plurality of access control groups has an independent level of access control relating to the given instance.

22. The computer system of claim 17, said method further comprising:
   obtaining the design information, said obtaining implemented by an agent; and
   transmitting the design information to the template manager, said transmitting the design information implemented by the agent.

23. The computer system of claim 17, said method further comprising:
   obtaining a portion of the control information, said obtaining implemented by an agent; and
   transmitting the portion of the control information to the template manager, said transmitting the portion of control information implemented by the agent.

24. The computer system of claim 17, said transmitting the N instances comprising transmitting the N instances to the corresponding N locations over telephone lines or cable lines.

25. The computer system of claim 17, said method further comprising:
   refreshing the template based on update design information, said refreshing the template implemented by the template manager;
   refreshing the remaining N−M instances based on the refreshed template, said refreshing the remaining N−M instances implemented by the template manager; and
   transmitting the refreshed remaining N−M instances to the corresponding N−M locations, said transmitting the refreshed remaining N−M instances implemented by the template manager.

26. The computer system of claim 25, said method further comprising providing the update design information to the template manager, said providing the update design information implemented by an agent.

27. The computer system of claim 17, said method further comprising providing the update control information to the template manager, said providing the update control information implemented by an agent.

28. The computer system of claim 17, said view comprising a Status column that identifies the status of Refreshed for the refreshed M instances and the status of Created for the remaining N−M instances.

29. The computer system of claim 28, said method further comprising identifying an additional database instance upon said creating the template, wherein during generating the view the additional instance has not been generated and has a status of Draft because the additional instance has been identified but has not yet been generated, said generated view identifying the additional instance as having the status of Draft, and wherein the Status column identifies the status of Draft for the additional instance.

30. The computer system of claim 29, said view further comprising a Date Last Drafted, Created or Refreshed column, wherein each entry in the Date Last Drafted, Created or Refreshed column identifies a last date at which the status of Draft, Created or Refreshed denoted in an associated entry in the Status column was respectively acquired by an associated instance of the N instances.

31. The computer system of claim 28, said view further comprising an Instance Identifier column, wherein each entry in the Instance Identifier column identifies a unique instance of the N instances, and wherein each entry in the Status column is associated with a correspond entry in the Instance Identifier column.

32. The computer system of claim 31, said view further comprising an Instance Server column, wherein each entry in the Instance Server column identifies a server at a location to which an associated instance in the Instance Identifier column has, or shall be, transmitted to the template manager.

33. A computer program product, comprising a computer usable medium having a computer readable code embodied therein, said computer readable code comprising software adapted to implement a method for generating and maintaining database instances in accordance with a template, said method comprising:

creating the template based on design information, said creating the template implemented by a template manager;

identifying N database instances upon said creating the template, each of the N instances not having been generated and having a status of Draft, said N at least 2;

storing the template in a template manager database, said storing the template implemented by the template manager;

generating the N instances based on the template and on control information for the N instances, said control information including configuration control information, said configuration control information identifying N locations corresponding to the N instances, said generating the N instances implemented by the template manager, said generated N instances having a status of Created because said N instances have been generated;

storing the N instances in the template manager database, said storing the N instances implemented by the template manager;

transmitting the N instances to the corresponding N locations, said transmitting the N instances implemented by the template manager;

refreshing M instances of the N instances based on update control information, said M less than N, said refreshing the M instances implemented by the template manager, said refreshed M instances having a status of Refreshed because said M instances have been refreshed, leaving a remaining N−M instances of the N instances still having the status of Created;

transmitting the M refreshed instances to the corresponding M locations, said transmitting the M instances implemented by the template manager; and generating a view, said generated view being a table, said generated view identifying the refreshed M instances as having the status of Refreshed and identifying the remaining N−M instances as having the status of Created.

34. The computer program product of claim 33, said view comprising a Status column that identifies the status of Refreshed for the refreshed M instances and the status of Created for the remaining N−M instances.

35. The computer program product of claim 34, said method further comprising identifying an additional database instance upon said creating the template, wherein during generating the view the additional instance has not been generated and has a status of Draft because the additional instance has been identified but has not yet been generated, said generated view identifying the additional instance as having the status of Draft, and wherein the Status column identifies the status of Draft for the additional instance.

36. The computer program product of claim 33, said view further comprising a Date Last Drafted, Created or Refreshed column, wherein each entry in the Date Last Drafted, Created or Refreshed column identifies a last date at which the status of Draft, Created or Refreshed denoted in an associated entry in the Status column was respectively acquired by an associated instance of the N instances.

37. The computer program product of claim 36, said view further comprising an Instance Identifier column, wherein each entry in the Instance Identifier column identifies a unique instance of the N instances, and wherein each entry in the Status column is associated with a correspond entry in the Instance Identifier column.

38. The computer program product of claim 31, said view further comprising an Instance Server column, wherein each entry in the Instance Server column identifies a server at a location to which an associated instance in the Instance Identifier column has, or shall be, transmitted to the template manager.

* * * * *

UNITED STATES PATENT AND TRADEMARK OFFICE
CERTIFICATE OF CORRECTION

PATENT NO. : 6,996,581 B2  
DATED : February 7, 2006  
INVENTOR(S) : Houston et al.

It is certified that error appears in the above-identified patent and that said Letters Patent is hereby corrected as shown below:

<u>Title page,</u>  
Item [57], ABSTRACT,  
Line 5, delete "(N≧2)" and insert -- (N≥2) --.

<u>Column 4,</u>  
Line 43, delete "(N≧2)" and insert -- (N≥2) --.  
Line 45, delete "M≦N" and insert -- M≤N" --.

<u>Column 9,</u>  
Line 33, delete "correspond" and insert -- corresponding --.  
Line 43, delete "implement" and insert -- implements --.

<u>Column 11,</u>  
Line 29, delete "correspond" and insert -- corresponding --.

Signed and Sealed this

Twenty-fifth Day of April, 2006

JON W. DUDAS  
*Director of the United States Patent and Trademark Office*